US007762661B2

(12) United States Patent
Beasley

(10) Patent No.: US 7,762,661 B2
(45) Date of Patent: Jul. 27, 2010

(54) GLASSES WITH TWO POSITION LENSES

(76) Inventor: Gary Beasley, P.O. Box 1663, Manifee, CA (US) 92565

( * ) Notice: Subject to any disclaimer, the term of this patent is extended or adjusted under 35 U.S.C. 154(b) by 0 days.

(21) Appl. No.: 12/538,386

(22) Filed: Aug. 10, 2009

(65) Prior Publication Data

US 2010/0053544 A1 Mar. 4, 2010

Related U.S. Application Data

(60) Provisional application No. 61/092,039, filed on Aug. 26, 2008.

(51) Int. Cl.
*G02C 7/06* (2006.01)
(52) U.S. Cl. .............................. 351/54; 351/61; 351/84; 351/86

(58) Field of Classification Search .................. 351/41, 351/54, 61, 83–86, 140, 141, 154, 158, 178
See application file for complete search history.

(56) References Cited

U.S. PATENT DOCUMENTS 7,484,842 B2 * 2/2009 Brzozowski ................. 351/41

* cited by examiner

*Primary Examiner*—Huy K Mai
(74) *Attorney, Agent, or Firm*—James A. Italia; Italia IP

(57) ABSTRACT

Glasses such as bifocals, which have refractive lenses which are rotatable at least between two positions. A manual control rotates the lenses such that if bifocal, the relatively small, high magnification zone of each lens can be moved to a high position opposed to the usual low position of fixed bifocals. The user is spared the necessity of holding the head at an awkward posture when viewing overhead objects.

16 Claims, 4 Drawing Sheets

GLASSES WITH TWO POSITION LENSES

CROSS-REFERENCE TO RELATED APPLICATION

This application claims the benefit of the filing date under 35 USC 119(e) of the filing date of U.S. Provisional Application Ser. No. 61/092,039, filed Aug. 26, 2008, the contents of which are incorporated herein by reference.

FIELD OF THE INVENTION

The present invention relates to glasses and more particularly to glasses wherein the refractive lenses are pivotally movable to two different positions.

BACKGROUND OF THE INVENTION

Corrective glasses typically have lenses that have been ground or otherwise formed to provide refraction according to a prescription particular to the user. Typically, refractive lenses are mounted in a frame which encircles each of the two lenses and extends to the ears for support.

Bifocal lenses are ground or formed to accommodate two different refractive characteristics at two locations within one lens. Typically, as a person ages, his or her eyes lose elasticity and are unable to focus at close ranges as they once did. Bifocals have two areas of different refractive characteristics so that an area providing relatively great magnifications permits the user to undertake activities such as reading, while the rest of the lens is directed to more distant visual tasks.

From time to time, a person who needs bifocal lenses must use the high magnification area of the lenses while viewing in a body position which may be quite different from that for reading. For example, repair technicians, building mechanics, and others who perform manual tasks must from time to time work in areas that are obstructed to direct access, or access which would be easily viewed if the person had perfect vision. Because the eyes must align in a particular way, it may be necessary for people who are working in tight quarters, or who must look upwardly to perform a particular task, to have to hold their heads in unnatural and awkward orientations in order to utilize the relatively small area or zone of bifocal lenses which provide relatively great magnification. Illustratively, a person may need to tilt his or her head backwardly to a great extent so that the line of sight passes through the high magnification zone while looking in an upward direction.

Holding the head in this unnatural and awkward position can cause muscle strain and other objectionable consequences, so that the task can become difficult and unpleasant if not entirely impossible.

The prior art has a need for increasing versatility of bifocal type glasses to ameliorate the unnatural and awkward body positions which are occasionally necessary given today's glasses configurations.

SUMMARY OF THE INVENTION

The present invention addresses the above stated need by providing eyeglasses in which the refractive lenses can pivot or rotate about a generally horizontal axis. When used with bifocal lenses, it is possible to position the high magnification zone of the refractive lenses such that the eyes can, with the head held at an orientation at or near the usual position for horizontal viewing, establish a line of sight through the high magnification zone which is achievable in conventional bifocal glasses only by severely tilting the head. This enables a person to do many overhead tasks which would become impossible with conventional bifocal glasses.

The example of bifocal lenses is only one application of the invention. Another example is glasses having color or other filters located in zones in a pattern similar to that of bifocal glasses. In certain tasks, such as welding for example, it may be desirable to have a color filter or light mask in the field of vision in one limited zone to permit close work, with relatively ordinary viewing characteristics prevailing elsewhere in the field of vision. Reflective characteristics may also be arranged according to the novel scheme.

The novel glasses may have an axle which engages the affected lens to rotate the latter. The axle may have a dial, wheel, lever, or other graspable or manipulable member which permits the user to rotate the affected lenses to various positions.

The axle may act on the lenses directly or alternatively, may act on an inner frame which holds the lenses securely. The inner frame may fit closely to an outer frame having a socket for each lens which is framed by the inner frame.

It is an object of the invention to provide glasses having lenses having zones with different optical effects to be manually adjustable so that one zone can be selectively repositionable so that the selected zone can be viewed in at least two different locations relative the glasses frame.

It is an object of the invention to ameliorate overhead vision using glasses having different optical effects in different zones, so that unpleasant and awkward positioning of the head is eliminated or reduced.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
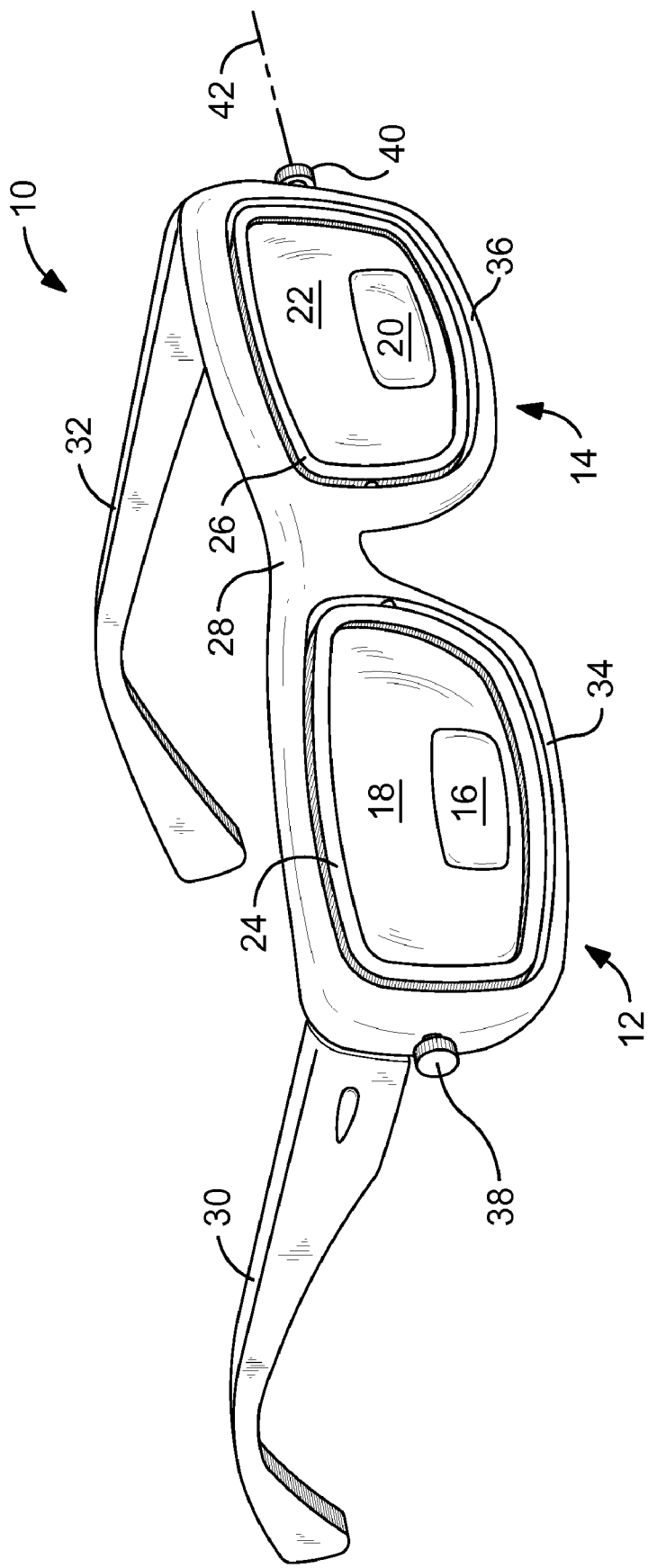
FIG. 1 is a perspective view of eyeglasses according to at least one aspect of the invention.

FIG. 1 shows a set of eyeglasses 10 of the type having lenses 12, 14 each including at least two zones 16, 18 and 20, 22, respectively, of different optical effects. Zones of different optical effects refers to treatment of light impinging on the eye of the wearer. Illustratively, the eyeglasses 10 may be of the bifocal type wherein a first zone 16 or 20 is intended for magnifying images for example to enable reading. A second zone 18 or 22 is intended for general vision. The lenses 12, 14 may be ground or formed to a prescription which may for example encompass correction of astigmatism as well as correcting for either nearsightedness or farsightedness. The zones 16, 18, 20, 22 may all correct for astigmatism, nearsightedness, farsightedness, or a combination of these, as well as differing in magnification or focal characteristics.

Correction of astigmatism, nearsightedness, and farsightedness are examples of optical effects. Other optical effects include interposing with respect to the eye a masking filter for reducing impinging light, a color filter for altering perception of impinging light, a polarizing lens, a fresnel lens, or any device which alters the pattern of light from that which would strike the eye in the absence of a device to alter the impinging light.

FIG. 1 shows the lenses 12 and 14 in one of several positions of use. Each lens 12 or 14 may be held within an inner frame such as the inner frame members 24, 26 which encircle and hold the respective lenses 12, 14. The eyeglasses 10 comprises a frame 28 which is a structural member which supports the lenses 12, 14 in appropriate or operative position on the user's head, and may include at least one head engaging member for further anchorage, such as the earpieces 30, 32. The frame 28 may comprise an outer frame such as the outer frame members 34, 36 which cooperates closely with and surrounds the inner frame members 24, 26.

Figure 2:
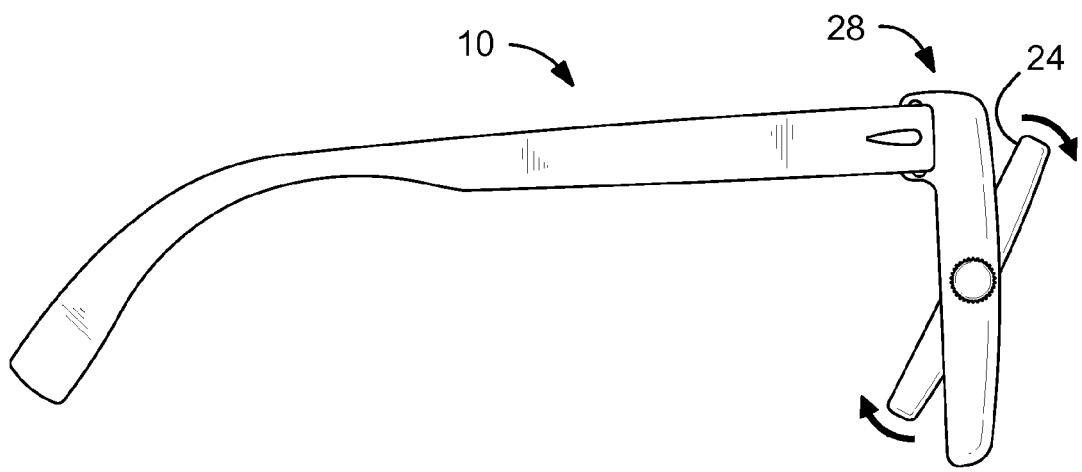
FIG. 2 is a side view of the eyeglasses of FIG. 1, showing rotation of the lenses according to an aspect of the invention.
Figure 3:
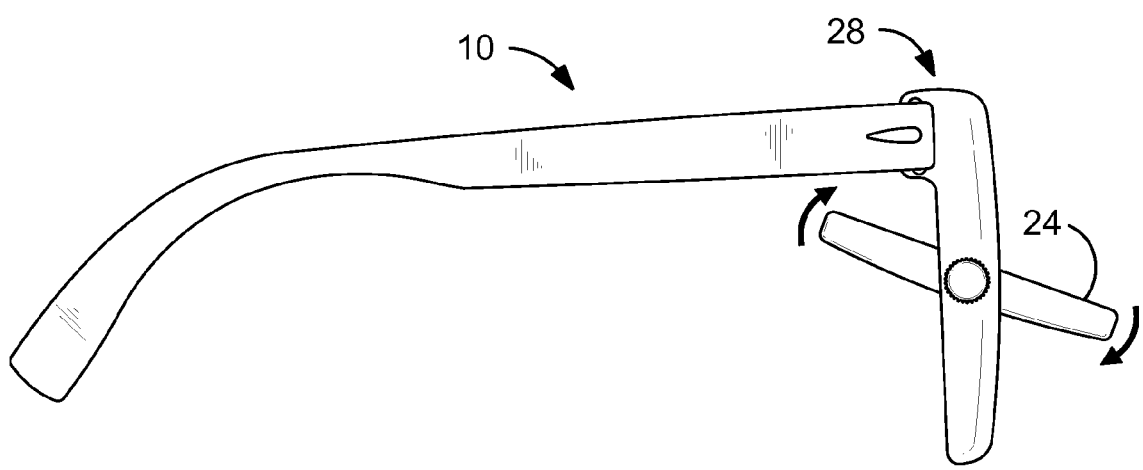
FIG. 3 is a side view similar to FIG. 2 but showing further rotation of the lenses.
Figure 4:
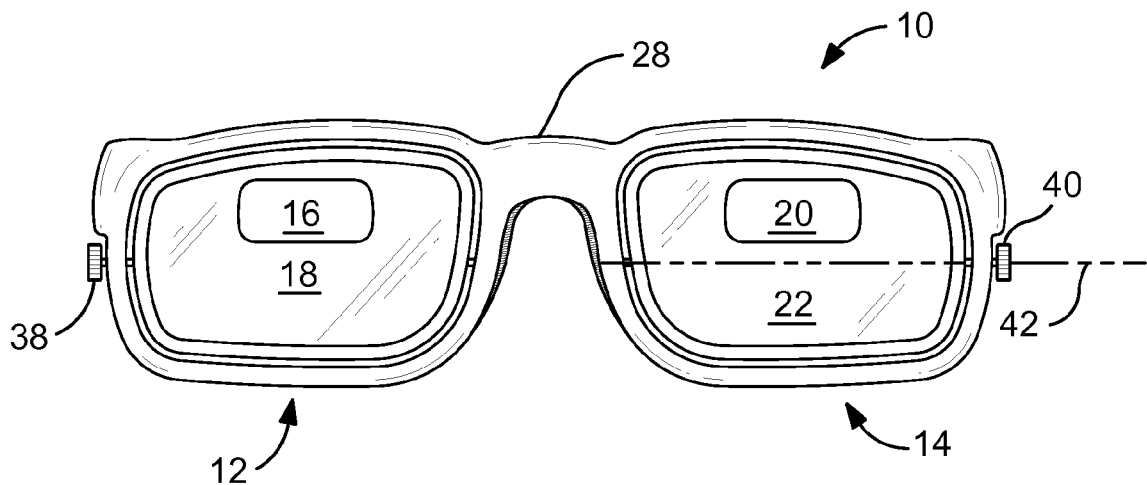
FIG. 4 is a front view of the eyeglasses of FIG. 1, showing the lenses fully rotated to a new operative position.

FIGS. 2 and 3 depict progressive rotation of the lenses 12 and 14 from the position shown in FIG. 1 to a newly selected position. It should be appreciated that the lenses have the ability to rotate in either direction. To move the lenses 12 and 14, a pivotal controller is provided. The pivotal controller may comprise two circular members such as wheels or dials 38, 40 (visible in FIG. 1) which project from the frame 28 so as to be accessible to finger manipulation to rotate the inner frame members 24 and 26 associated to their corresponding lenses 12, 14 (also visible in FIG. 1). FIG. 4 shows the lenses 12, 14 repositioned in a newly selected position. The pivotal controller will be understood to include a suitable rod or axle (not visible in FIG. 1) which connects the respective dials 38, 40 to their associated lenses 12, 14 or inner frame members 24, 26.

The pivotal controller is disposed to rotate the first lens 12 and the second lens 14 about an axis such as the axis 42 between at least a first position and a second position. In the first position (shown in FIG. 1), the first zone 16, 20 of the first lens 12 and the second lens 14 is in line of sight when the person wearing the eyeglasses 10 is looking in one direction with the head held in the normal position. In the second position, the first zone of the same lens, such as the first zone 16 of the lens 12 is in line of sight when the person is looking in an upward direction relative to the one direction, with the head held in the same normal position.

It should be noted at this point that orientational terms such as up and down, left and right, and others refer to the drawing as viewed by an observer. The term "normal position" refers to a person standing upright with the eyes focused horizontally. In this position, the length of the earpieces, such as the earpieces 30, 32, will usually be horizontal.

In summary, the lenses 12, 14 are repositionable so that a selected zone, such as the zones 16, 20 can be viewed selectively at two different locations.

Figure 5:
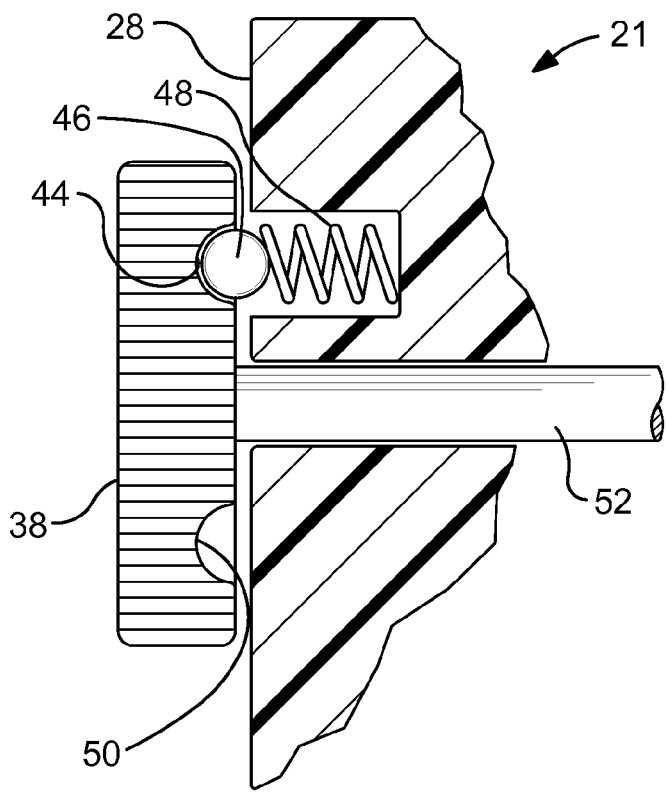
FIG. 5 is a detail view of the left center of FIG. 4, drawn to enlarged scale.

The eyeglasses 10 may comprise a position lock mechanism 21, as illustrated in FIG. 5 and further described below, and would be disposed to releasably maintain at least one lens, such as the lens 12 selectively in the two discrete rotational positions shown in FIGS. 1 and 4 upon being rotated into the respective discrete rotational positions. Illustratively, and referring now to FIG. 5, the dial 38 may comprise a recess 44 which may receive a ball 46 which is urged towards the recess 44 by a spring 48. The location of the recess 44 is selected such that it aligns with the ball 46 when the lens 12 is in one of the two operative positions shown in FIGS. 1 and 4, and a corresponding recess 50 is aligned with the ball 46 when the lens 12 is in the other of the two operative positions. An axle 52 which is rotated by the dial 38 is seen in FIG. 5.

Figure 6:
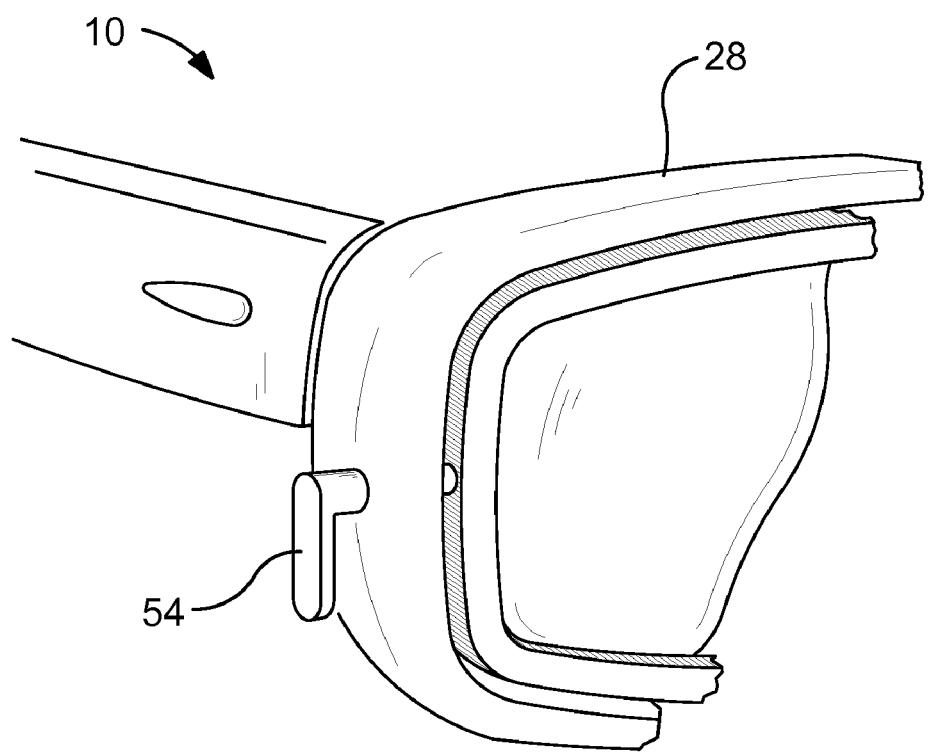
FIG. 6 is a detail view of eyeglasses according to another aspect of the invention, and is drawn to enlarged scale.

FIG. 6 shows a pivotal controller comprising a lever 54 which is provided in place of the dial 38 of FIG. 5. The frame 28 of the eyeglasses 10 may be modified to conceal the lever 54 if desired, provided that the lever 54 project from the frame 28 so as to be accessible to finger manipulation to rotate the pivotal controller and at least one of the first lens 12 and the second lens 14.

Figure 7:
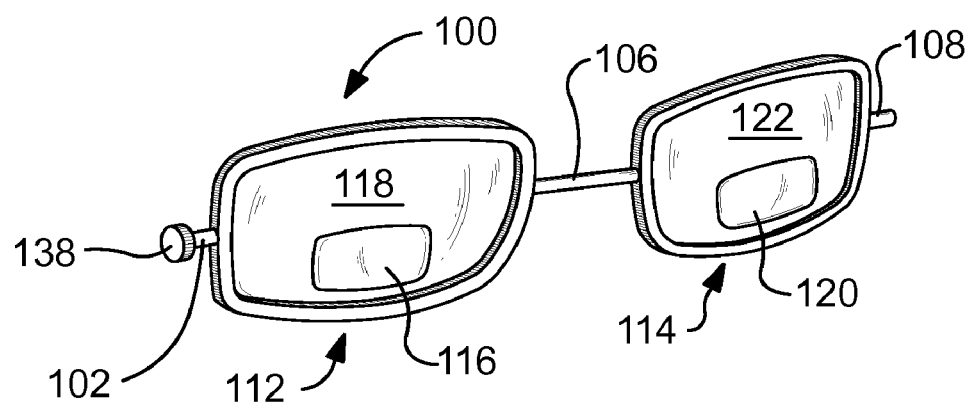
FIG. 7 is a front detail view of a component of eyeglasses according to still another aspect of the invention.

FIG. 7 shows an aspect of the invention wherein an inner frame member 100 spans and connects both a first lens 112 and also a second lens 114. Lenses 112 and 114 are linked by a nose bridge 106. The nose bridge 106 can be rigid but is preferably constructed of a semi-flexible material such that when worn by the wearer it is able to conform to the wearer's nose regardless of orientation. The first lens 112 may comprise a first zone 116 and a second zone 118 which may be structural and functional counterparts to the first zone 16 and the second zone 18 of FIG. 1. Similarly, the second lens 114 may be the structural and functional counterpart to the second lens 14 of FIG. 1, also composed of a first zone 120 and a second zone 122 corresponding to the first zone 20 and the second zone 22 of FIG. 1 respectively. It will be apparent that rotation of the inner frame member 100 will rotate both the first lens 112 and also the second lens 114. This arrangement assures that the pivotal controller, such as the dial 138, rotate both the first lens 112 and the second lens 114 simultaneously. The inner frame member 100 may comprise a stub 108 which may be connected to another pivotal controller (not shown) or alternatively may provide the function of a journal to support the end of the inner frame member 100 which is opposite the dial 138.

It should be understood that components presented in the singular may be provided in the plural, and vice versa, where feasible. Illustratively, the inner frame members 24, 26 of FIG. 1 may be modified to become unitary or integral with one another, as seen in the example of the inner frame member 100.

In another example, the pivotal controller may be provided as two devices each rotating or pivoting one of the lenses, such as the lenses 12, 14, independently of the other. The position lock may also be provided as two independently acting position locks.

The present invention is susceptible to modifications and variations which may be introduced thereto without departing from the inventive concepts. For example, although the position lock been described with respect to the spring urged ball 46, it could take other forms and other locations. An interference finger (not shown), for example such as a ratchet and pawl arrangement, could be provided.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

What is claimed is:

1. Eyeglasses of the type having lenses including at least two zones of different optical effects, wherein the lenses are repositionable so that a selected zone can be viewed at two different locations, comprising:

a first lens and a second lens each one of which has a first zone having first optical effects and a second zone having second optical effects;

a frame disposed to support the first lens and the second lens in operative position on the head of a person, wherein the frame includes at least one head engaging member; and a pivotal controller disposed to rotate the first lens and the second lens about an axis between at least a first position and a second position, wherein in the first position, the first zone of at least one of the first lens and the second lens is in line of sight when the person is looking in one direction with the head held in the normal position, and in the second position, the first zone of the same lens is in line of sight when the person is looking in an upward direction relative to the one direction, with the head held in the same normal position.

2. The eyeglasses of claim 1, further comprising an inner frame disposed to encircle and hold the first lens and the second lens, and the frame comprises an outer frame disposed to cooperate closely with and surround the inner frame.

3. The eyeglasses of claim 1, wherein the first optical effects of the first zone of at least the first lens comprise magnification characteristics greater than those of the second optical effects of the second zone, whereby the eyeglasses are of the bifocal type.

4. The eyeglasses of claim 1, wherein the pivotal controller spans the first lens and the second lens such that rotation of the pivotal controller rotates both the first lens and the second lens simultaneously.

5. The eyeglasses of claim 1, wherein the pivotal controller comprises a circular member which projects from the frame so as to be accessible to finger manipulation to rotate the pivotal controller and at least one of the first lens and the second lens.

6. The eyeglasses of claim 5, further comprising a position lock disposed to releasably maintain at least the first lens selectively in two discrete rotational positions upon being rotated into the respective discrete rotational positions.

7. The eyeglasses of claim 1, wherein the pivotal controller comprises a lever which projects from the frame so as to be accessible to finger manipulation to rotate the pivotal controller and at least one of the first lens and the second lens.

8. The eyeglasses of claim 7, further comprising a position lock disposed to releasably maintain at least the first lens selectively in two discrete rotational positions upon being rotated into the respective discrete rotational positions.

9. Eyeglasses of the type having lenses including at least two zones of different optical effects, wherein the lenses are repositionable so that a selected zone can be viewed at two different locations, comprising:

a first lens and a second lens each one of which has a first zone having first optical effects and a second zone having second optical effects;

a frame disposed to support the first lens and the second lens in operative position on the head of a person, wherein the frame includes at least one head engaging member;

a first inner frame member disposed to encircle and support the first lens and a second inner frame member disposed to encircle and support the second lens;

a pivotal controller disposed to rotate the first lens and the second lens about an axis between at least a first position and a second position, wherein in the first position, the first zone of at least one of the first lens and the second lens is in line of sight when the person is looking in one direction with the head held in the normal position, and in the second position, the first zone of the same lens is in line of sight when the person is looking in an upward direction relative to the one direction, with the head held in the same normal position; and a position lock disposed to releasably maintain at least the first lens selectively in two discrete rotational positions upon being rotated into the respective discrete rotational positions.

10. The eyeglasses of claim 9, wherein the first optical effects of the first zone of at least the first lens comprise magnification characteristics greater than those of the second optical effects of the second zone, whereby the eyeglasses are of the bifocal type.

11. The eyeglasses of claim 9, wherein the pivotal controller spans the first lens and the second lens such that rotation of the pivotal controller rotates both the first lens and the second lens simultaneously.

12. The eyeglasses of claim 9, wherein the pivotal controller comprises a circular member which projects from the frame so as to be accessible to finger manipulation to rotate the pivotal controller and at least one of the first lens and the second lens.

13. The eyeglasses of claim 9, wherein the pivotal controller comprises a lever which projects from the frame so as to be accessible to finger manipulation to rotate the pivotal controller and at least one of the first lens and the second lens.

14. Eyeglasses of the type having lenses including at least two zones of different optical effects, wherein the lenses are repositionable so that a selected zone can be viewed at two different locations, and wherein the first optical effects of the first zone of at least the first lens comprise magnification characteristics greater than those of the second optical effects of the second zone, whereby the eyeglasses are of the bifocal type. comprising:

a first lens and a second lens each one of which has a first zone having first optical effects and a second zone having second optical effects;

a frame disposed to support the first lens and the second lens in operative position on the head of a person, wherein the frame includes at least one head engaging member;

a first inner frame member disposed to encircle and support the first lens and a second inner frame member disposed to encircle and support the second lens;

a pivotal controller disposed to rotate the first lens and the second lens about an axis between at least a first position and a second position, wherein in the first position, the first zone of at least one of the first lens and the second lens is in line of sight when the person is looking in one direction with the head held in the normal position, and in the second position, the first zone of the same lens is in line of sight when the person is looking in an upward direction relative to the one direction, with the head held in the same normal position, and wherein the pivotal controller spans the first lens and the second lens such that rotation of the pivotal controller rotates both the first lens and the second lens simultaneously; and a position lock disposed to releasably maintain at least the first lens selectively in two discrete rotational positions upon being rotated into the respective discrete rotational positions.

15. The eyeglasses of claim 14, wherein the pivotal controller comprises a lever which projects from the frame so as to be accessible to finger manipulation to rotate the pivotal controller and at least one of the first lens and the second lens.

16. The eyeglasses of claim 14, wherein the pivotal controller comprises a circular member which projects from the frame so as to be accessible to finger manipulation to rotate the pivotal controller and at least one of the first lens and the second lens.

* * * * *